United States Patent [19]
Takase et al.

[11] Patent Number: 5,612,959
[45] Date of Patent: Mar. 18, 1997

[54] MULTICAST COMMUNICATIONS METHOD

[75] Inventors: Akihiko Takase, Tokyo; Shiro Tanabe, Hidaka; Noboru Endo, Kodaira; Ryoji Takeyari, Koganei; Yusuke Mishina, Kodaira; Toshiya Oouchi, Kokubunji; Junichirou Yanagi, Kodaira, all of Japan

[73] Assignee: Hitachi, Ltd., Tokyo, Japan

[21] Appl. No.: 86,088

[22] Filed: Jul. 6, 1993

[30] Foreign Application Priority Data

Jul. 8, 1992 [JP] Japan ................... 4-180180

[51] Int. Cl.$^6$ ................................ H04L 12/28
[52] U.S. Cl. ........................... 370/390; 370/397
[58] Field of Search ............ 370/94.1, 60, 85.13, 370/85.14, 94.3, 60.1, 61, 94.2; 340/825.02

[56] References Cited

U.S. PATENT DOCUMENTS

| | | | |
|---|---|---|---|
| 4,734,907 | 3/1988 | Turner | 370/60 |
| 4,813,038 | 3/1989 | Lee | 370/94.1 |
| 5,165,021 | 11/1992 | Wu | 370/85.13 |
| 5,179,555 | 1/1993 | Videlock et al. | 370/85.13 |
| 5,247,518 | 9/1993 | Takiyasu et al. | 370/94.2 |
| 5,331,637 | 7/1994 | Francis et al. | 370/94.3 |
| 5,473,608 | 12/1995 | Gagne et al. | 370/94.3 |

FOREIGN PATENT DOCUMENTS

| | | |
|---|---|---|
| 63-9252 | 1/1988 | Japan . |
| 63-287228 | 11/1988 | Japan . |

*Primary Examiner*—Douglas W. Olms
*Assistant Examiner*—Dang Ton
*Attorney, Agent, or Firm*—Fay, Sharpe, Beall, Fagan, Minnich & McKee

[57] ABSTRACT

Distributed LANs are connected to a wide area network through terminal adapters, which are interconnected by virtual circuits to form a logical bus network. Each terminal adapter copies cells received through the virtual circuit that is allocated for multicasting, and transfers the copied cells to the adjacent terminal adapters via preset virtual circuits. The terminal adapters assemble a part or all of the transmitted message from the received cells and, according to the contents of the assembled message, transfer the copies of the cells to the adjacent terminal adapters through predetermined virtual circuits.

31 Claims, 11 Drawing Sheets

FIG. 5(b)

| DESTINATION ADDRESS 521 | TRANSMITTED VCI 522 |
|---|---|
|  |  |
|  |  |
|  |  |
|  |  |
|  |  |
|  |  |
|  |  |
|  |  |

FIG. 5(c)

| RECEIVED VCI 523 | CELLS ARE TO BE MULTICAST 524 | TRANSMITTED VCI 525 |
|---|---|---|
|  | ○ |  |
|  |  |  |
|  |  |  |
|  | ○ |  |
|  |  |  |
|  | ○ |  |
|  |  |  |
|  |  |  |

MULTICAST COMMUNICATIONS METHOD

FIELD OF THE INVENTION

The present invention relates to a multicast communications method, and in particular to a method of communication between a plurality of terminal equipment or communications networks distributed in a wide area through a wide area communications network that uses an asynchronous transfer mode (hereinafter ATM). Communication paths are set up so that information to be transmitted from terminal equipment or a communications network at one node can be sent to a plurality of terminal equipment or a communications network at other nodes within the wide area network and so that terminal equipment or a communications network at one node can receive information through the wide area network from a plurality of terminal equipment or communications networks at other nodes in the wide area network.

BACKGROUND OF THE INVENTION

A multicast communications method is disclosed in published Japanese Patent Application laid-open no. 9252/1988, According to the disclosed method, packet switching is used in a wide-area network (WAN) to interconnect a plurality of widely distributed terminal equipment and communications networks on a customer's premises. By this method, when a packet is transmitted from terminal equipment with a header indicating that the packet is to be transmitted to a plurality of other terminal equipment (multiple terminal equipment), a packet exchange that receives the transmitted packet sends it out to the multiple terminal equipment that are indicated by the transmitted packet. This sets up a point-to-multipoint logical link between the terminal equipment at the transmitting side and the multiple terminal equipment at the receiving side so that the same information is transmitted from one terminal and received by a plurality of other terminals.

In local area networks (LANs) a variety of control information is exchanged between terminals connected on the LAN or between routers used to interconnect LANs on a customer's premises. Usually, this type of control information is exchanged using a multicast communication methods. For example, routers send address information of the terminal equipment to be connected to a LAN and address information for routing to other networks to adjacent routers.

In Japanese Patent Publication laid-open no. 287228/1988, a multicast communications method is disclosed that includes providing destination information in the transmitted data identifying the terminal equipment at the receiving side, providing the node equipment between the sending terminal and the receiving terminal with a table of destination information that indicates the relationship between each piece of terminal equipment and the node equipment or terminal equipment to which the data is transferred next. According to this method, the destination information is compared with the table of destination information, and, if necessary, one or a limited small number of copies of the transmitted data is sent to the particular node equipment or terminal equipment at the receiving side.

When using a packet exchange for performing multicast communications between terminal equipment distributed in a wide area through a WAN, it is required that an additional function of multicast communications be added to the packet exchange. Further, communication by conventional packet exchange has a low through put, so such communication cannot be used to interconnect LANs, which are used on a customer's premises.

In order to provide connection between LANs, a network using an asynchronous transfer mode (ATM) can be used. The ATM network performs switching on the basis of a virtual channel identifier (VCI) that is added to a cell having a fixed length of information, and that is transferred in place of a conventional packet. In an ATM network, it is possible to create a plurality of virtual circuits in a single physical circuit. In this way, multiple LANs can be connected by providing different virtual channel identifiers for each LAN destination. An ATM network, as shown in FIG. 2, has terminal adapters 21A, 21B, 21C, 21D and 21E that connect LANs 12A, 12B, 12C, 12D and 12E to the network. In order to perform multicast communications of a cell to a predetermined number of terminal adapters, copies of the cells must be made and sent out, one for each of the specified number of terminal adapters. Thus, the terminal equipment which can be at the receiving side is limited in number by the multicast capability of the terminal adapters or other node equipment, such as ATM exchanges or routers. Conventional adapters or ATM exchanges perform switching and sending of these cells by hardware. This is necessitated by the higher transmission rate and shorter processing time that is required when performing multicast communications of cells since the cells are shorter in length than the conventional packets. In such high speed processing, the time taken to copy the cells is significant, and therefore only a small number of cells can be copied.

Usually, it is desired to transmit information to only one specific terminal or router, but often the information is multicast or broadcast to all of the terminal adapters because the destination address of the specific terminal or router is not known. Sending information to all of the terminal equipment in the wide area network undesirably increases the traffic in the network. Such an increase in traffic may cause blockage in the network or require that the network be increased in size at an additional cost.

SUMMARY OF THE INVENTION

It is an object of the present invention to provide multicast communications between terminal equipment and communications networks that are connected through a wide area network (WAN).

It is an object of the invention to provide a method for preventing an unnecessary increase in traffic in the WAN when performing multicast communications between terminal equipment and/or communications networks connected to the WAN.

It is still another object of the invention to provide a communications method that permits searching of data, particularly data stored in databases, through multiple terminal equipment connected to a WAN.

It is yet a further object of the invention to provide a method for performing multicast communications between a plurality of terminal equipment and/or communications networks without altering an existing ATM switched network or WAN.

To accomplish the objectives of the invention, a multicast communications method according to the invention performs multicasting of information between terminal equipment and/or communications networks connected to a WAN by providing at least one of the receiving terminal equipment or communications network in the WAN with a data receiving and copying function for copying the received information and transferring it through the WAN to other receiving terminal equipment or communications networks so that all of the desired terminal equipment or communications networks in the WAN receive the originally transmitted information.

In a preferred embodiment of the invention, terminal adapters are provided at each source or destination node between the WAN and terminal equipment or communications network at the node. The terminal adapters convert the information to be transmitted into cells and a virtual channel identifier (VCI) is added to each cell. The cells with the VCI are transmitted over the WAN and are received by terminal adapters of the designated receiving terminal equipment or communications networks. Each such terminal adapter has a cell copying function and VCI inspection function that determines if the received cells are to be transferred to the terminal equipment or communications network for that terminal adapter, or if the cells should be copied and transferred, or if the multicast communications has been completed. When the multicast communication of the cells has been completed, the copying and transferring functions of the terminal adapters is terminated so that the cells are not transferred any further in the WAN.

In the embodiment of the invention, the wide area network is an ATM network, but the invention is not limited in its application to an ATM network. Further, although terminal equipment is described generally, the term is used to mean any communicating device, including a computer, data base and the like. In addition, the communications networks can be LANs and other equipment conventionally provided on a customer's premises.

Since each of the terminal adapters is provided with a cell copying function, the number of copies that are required from each terminal adapter in order to provide multicast communications is small, and as few as one or two copies may be all that are required in practical applications. The number of copies in total that are made by the terminal adapter is determined to be less than the number of terminal equipment and communications networks that are to receive the transmitted information when the multicast communication is performed. The receiving terminal equipment or communications networks and the sending terminal equipment or communications networks form a logical bus or a tree-shaped (tree topology) information transfer path when the multicast communications method is performed. The bus is made up of a single path or loop shaped path connected to a plurality of terminal equipment or communications networks. The tree-shaped information transfer path is formed by placing the terminal equipment or communications networks at branch points. Additional terminal equipment or communication networks are provided on the branch lines downstream from the branch point, and this structure is repeated for as many levels as necessary to complete the tree-shaped transfer path.

A preferred embodiment of a terminal adapter for use in the present invention includes a first transmitting cell preparation block that transforms the information to be multicast into cells and adds a VCI to each of the cells. Each adapter also includes a second cell preparation block that decides, according to the VCI of a received cell, whether the received cell is to be copied, and, if so, copies the received cell and adds a VCI to the copied cells for further transmission. A transmitting block multiplexes the transmitting cell from the first and second cell preparation blocks and sends them out. Also, a signal assembly block is included that transforms the received cell into data of a format for the receiving terminal equipment or communications network.

By the present invention, the number of copied cells made by each terminal adapter is much smaller than the total number of terminal equipment or communications networks to which the information is to be multicast. For example, only one or two copies of a cell are made, so the copying is processed at high speed by hardware. A plurality of terminal equipment or communications networks which are designated to receive the same information are linked by a logical bus or a tree-shaped path within the WAN, thus accomplishing the multicast communications objective. That is, each terminal adapter makes one or two copies of a received cell and sends the copied cells out to adjacent terminal adapters. By repeating this process, all of the terminal adapters intended to receive the cells in a multicast communications operation are interconnected by a logically-formed virtual bus, loop or tree-shaped transmission path within the network. Once the multicast communication operation has been completed, the data relay and transfer is terminated to prevent the occurrence of unnecessary traffic in the WAN.

According to the present invention, a multicast communications method can be performed over a WAN without changing the existing network.

BRIEF DESCRIPTION OF THE DRAWINGS

FIGS. 5(b) and 5(c) are address conversion tables useful for explaining functions performed by the terminal adapter.

DESCRIPTION OF THE PREFERRED EMBODIMENTS

Embodiments of the present invention will be described with reference to the accompanying drawings.

Figure 1:
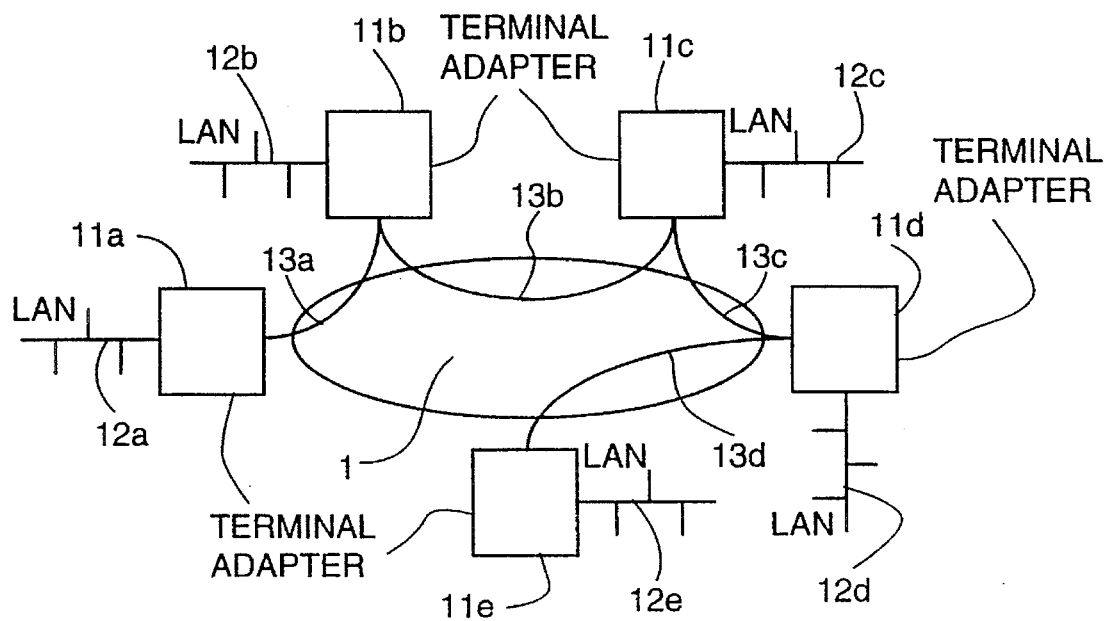
FIG. 1 is a schematic diagram showing a communications network, illustrating a first embodiment of the multicast communications method according to the present invention.

FIG. 1 is a diagram of a communications network illustrating a first embodiment of a multicast communications method according to the invention. In this embodiment, a plurality of distributed terminal communications networks or LANs 12a, 12b, 12c, 12d and 12e are interconnected by an ATM wide area network 1. LANs 12a, 12b, 12c, 12d, 12e are connected to the ATM user-network interface of the wide area network 1 by terminal adapters 11a, 11b, 11c, 11c, 11d and 11e. LANs 12 and the ATM switched network forming the wide area network 1 have well-known conventional configurations. The configuration of the terminal adapter 11 will be described in greater detail hereinafter with reference to FIG. 5.

When transmitting a LAN packet containing information from LAN 12a to terminal equipment contained in the LANs 12b, 12c, 12d, 12e, the terminal adapter 11a divides the LAN packet received from the LAN 12a into ATM cells. In this process, a virtual channel identifier (VCI) is added, based on the destination addresses of the packet, to a header of the divided ATM cell. The terminal adapter 11a sends the ATM cells allocated with the VCIs into the wide area network 1. The wide area network 1 sets up (i.e. carries out routing) a virtual connecting path 13a to the terminal adapter 11b according to the VCIs of the received cells. The terminal adapter 11b assembles the received ATM cells into a LAN packet and sends them across the LAN 12b connected thereto. At the same time the terminal adapter 11b copies the cells and sends them into the wide area network 1. The wide area network 1 then sets up a virtual connecting path 13b to the terminal adapter 11c according to the VCIs of the received cells. The terminal adapter 11c assembles the received ATM cells into a LAN packet and sends them to the LAN 12c, and at the same time copies the cells and sends them into the wide area network 1. A similar process of copying the received ATM cells, allocating the VCIs to the cells and setting up connecting paths 13c, 13d (i.e. routing paths 13c, 13d) is repeated to perform the multicast communications.

The paths 13a, 13b, 13c, 13d and 13e shown by the thick lines are logical paths, which are virtual circuits provided by the ATM exchanges that make up the wide area network 1. The decision of whether to copy the received cells and to send them out again is made according to the VCIs. By repeating the above operation, the plurality of terminal adapters 11a, 11b, 11c, 11c, 11d, 11e operate as if they are connected through a logic bus path while in reality they are connected in series to the wide area network 1. Therefore, any terminals connected to the LAN 12a at the transmitting side can multicast information to all or part of the remote terminal equipment connected to the WAN through the LANs that are interconnected at the source/destination nodes in the wide area network 1. As a result, terminals connected to a LAN at one point along the WAN can communicate with terminals connected to another LAN connected to the WAN in the same way as they would communicate if they were connected to the same LAN. By the multicast communications method of this embodiment, therefore, each terminal adapter 12 can realize multicast communications by simply making one set of copies of the ATM cells.

Figure 3:
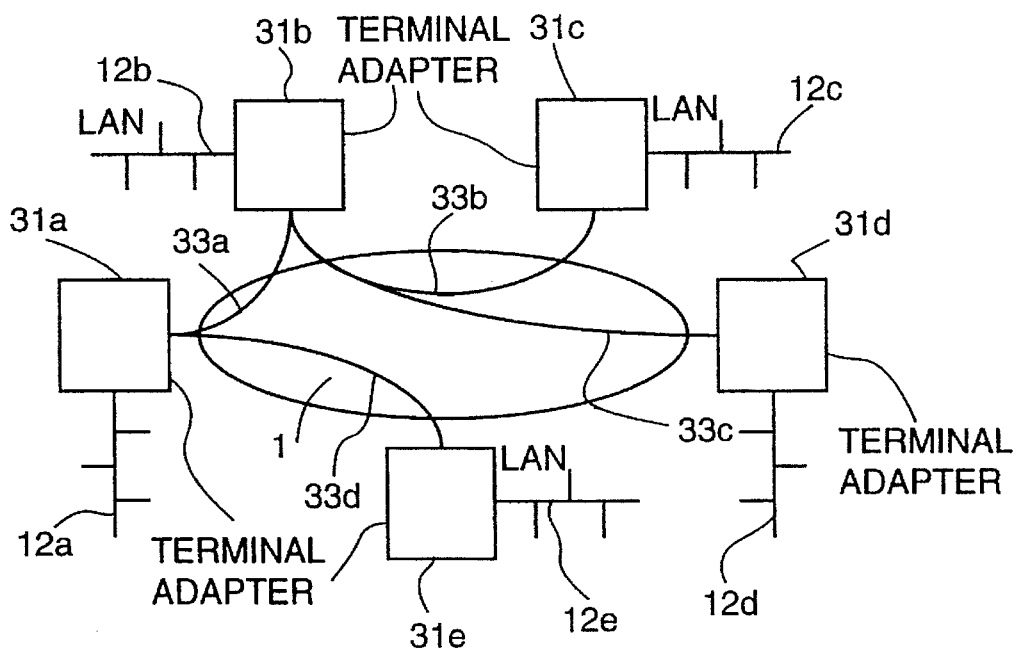
FIG. 3 is a schematic diagram showing a communications network, illustrating a second embodiment of the multicast communications method according to the present invention.

FIG. 3 shows a communications network illustrating a second embodiment of the multicast communications method according to the invention. In this embodiment, at least some of the terminal adapters have the ability to make two sets of copies of the ATM cells. As shown in the figure, logical communication paths are formed in a tree shape in the wide area network 1. A terminal adapter 31a at a source/destination node point in the WAN decomposes a LAN packet received from the LAN 12a, which is considered to be a terminal communications network, into ATM cells and makes two sets of copies of the cells before sending them into the wide area network 1. One of the copies of cells is transmitted to a terminal adapter 31b through a virtual circuit 33a and the other to a terminal adapter 31e through a virtual circuit 33d. The terminal adapter 31b makes two sets of copies of the ATM cells received, and sends one set to a terminal adapter 31c through a virtual circuit 33b and the other to a terminal adapter 31d through a virtual circuit 33c. By this method, all terminal adapters that are to receive the same information originating from the LAN 12a and terminal adapter 31a are interconnected by a logical tree-shaped virtual network. This embodiment of the invention therefore permits multicasting to all terminal adapters in the WAN with fewer junction circuits by forming a logical tree-shaped network.

Figure 4:
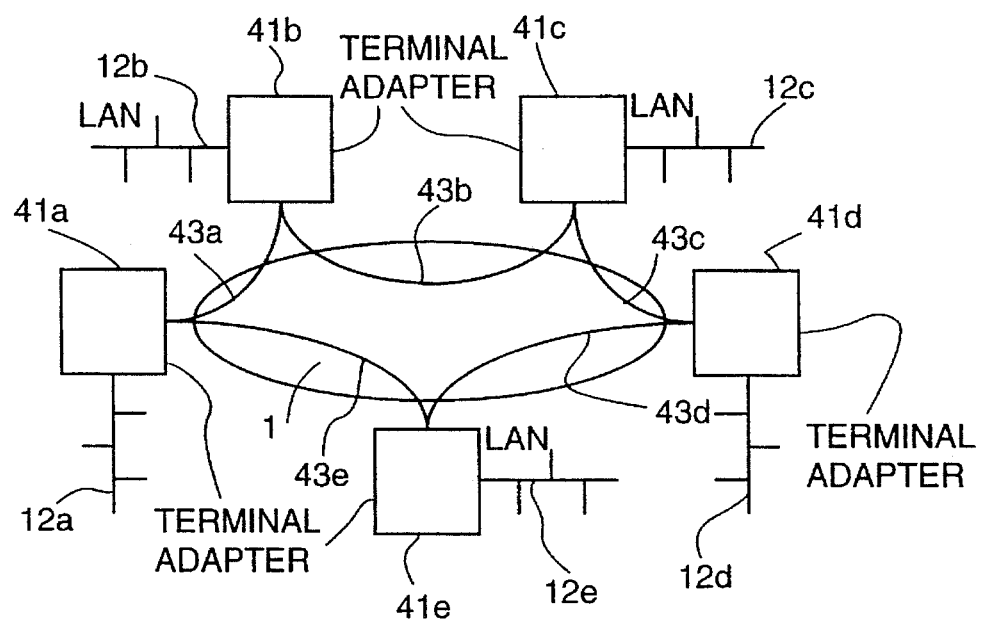
FIG. 4 is a schematic diagram showing a communications network, illustrating a third embodiment of the multicast communications method according to the present invention.
Figure 2:
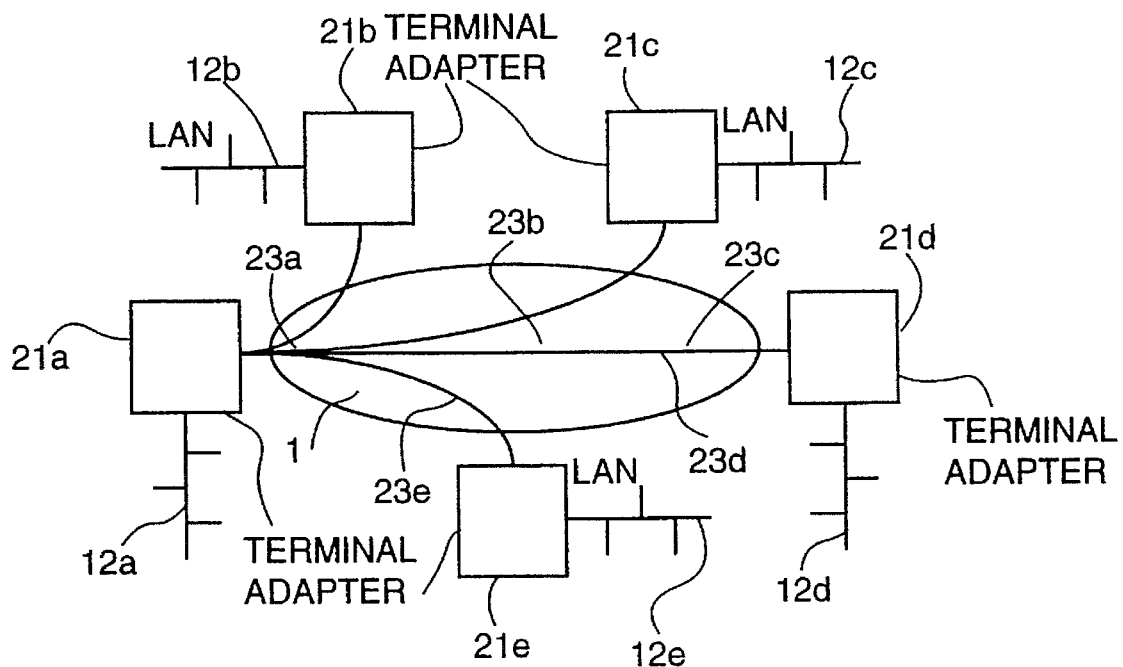
FIG. 2 is a schematic diagram of a communications network embodying the prior art.

FIG. 4 shows a communications network for explaining a third embodiment of the multicast communications method according to the invention. In this embodiment, terminal adapters 41a, 41b, 41c, 41d and 41e are interconnected by virtual circuits 43a, 43b, 43c and 43d to form a logical bus in the WAN. A terminal adapter 41e located at the end of the logical bus is connected to the terminal adapter 41a by a virtual circuit 43e to form a logical ring or loop. The method of this embodiment allows bidirectional communication without setting up different virtual circuits in the transmitting and receiving directions.

Figure 5A:
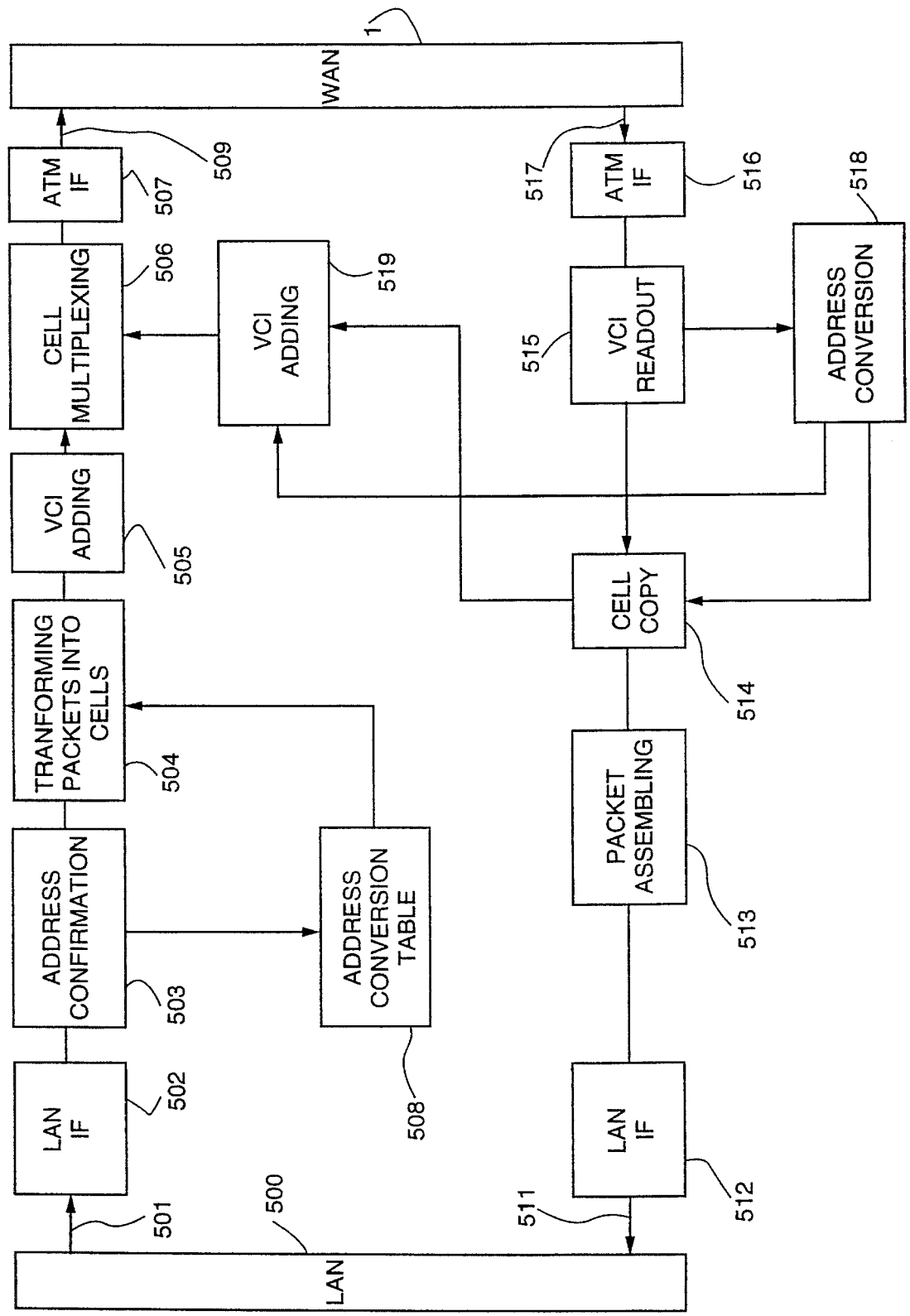
FIG. 5(a) is a block diagram of an example of a terminal adapter used in the multicast communications methods of the present invention.

FIG. 5(a) is a block diagram showing a configuration of an example of a terminal adapter used in the multicast communications methods of the invention. A LAN packet is received from a LAN 500, as indicated by arrow 501, by a LAN interface 502 at the receiving side of the terminal adapter. The LAN packet is transferred to an address confirmation block 503 which extracts the destination address 521 from the packet. The extracted destination addresses are input to an address conversion block 508 having an address conversion table 508(a), shown in FIG. 5(b). Based on the extracted destination address, a VCI 522 to be used for transmission in the ATM is determined using address conversion table 508(a) present at the sending side of the terminal adapter. The received LAN packet is then divided by an ATM adaptation block 504 into a plurality of cells. As one example, 1 k of data received as a LAN packet is divided into ATM cells of 53 bytes each, having a 5 byte header and a 43 byte payload. The transmission VCIs 522 are attached by the VCI allocation block 505 to the cells. These cells and others, which will be described later, are multiplexed by a cell multiplexing block 506 before being sent out as indicated by arrow 509 from the ATM interface 507 at the transmitting side of the terminal adapter into the wide area network 1.

During receiving, the terminal adapter receives cells, as indicated by arrow 517, from the wide area network 1 at the ATM interface 516. The received cells are fed to a VCI readout block 515 that extracts the VCIs 523. The extracted VCIs 523 are input to an address conversion block 518 having an address conversion table 518(*a*), shown in FIG. 5(*c*). Information 524 on whether multicasting is requested or not is derived from the VCI conversion. When a request for multicasting is determined to be present, a VCI 525 corresponding to the next transmission destination is determined from table 518.

Also during the receiving of ATM cells, it is determined whether it is necessary to copy the cells that are received. This determination is made by the address conversion block 518 on the basis of the VCI 523 that is extracted from the cell with reference to table 518. It is determined that the cells are to be copied if multicasting is required. That is, the cells to be multicast are copied by the cell copy block 514 in accordance with an instruction received from the address conversion block 518 at the receiving side. After copying, new VCIs are added to the copied cells by the VCI allocation block 519 and then multiplexed with other cells to be transmitted by the cell multiplexing block 506 through ATM interface 507. Meanwhile, the originally received cells are assembled into a LAN packet by a packet assembly block 513 and then are sent, as indicated by the arrow 511, from the LAN interface 512 at the sending side to the LAN 500, after which they can be received by terminal(s) connected to the LAN 500.

Figure 6:
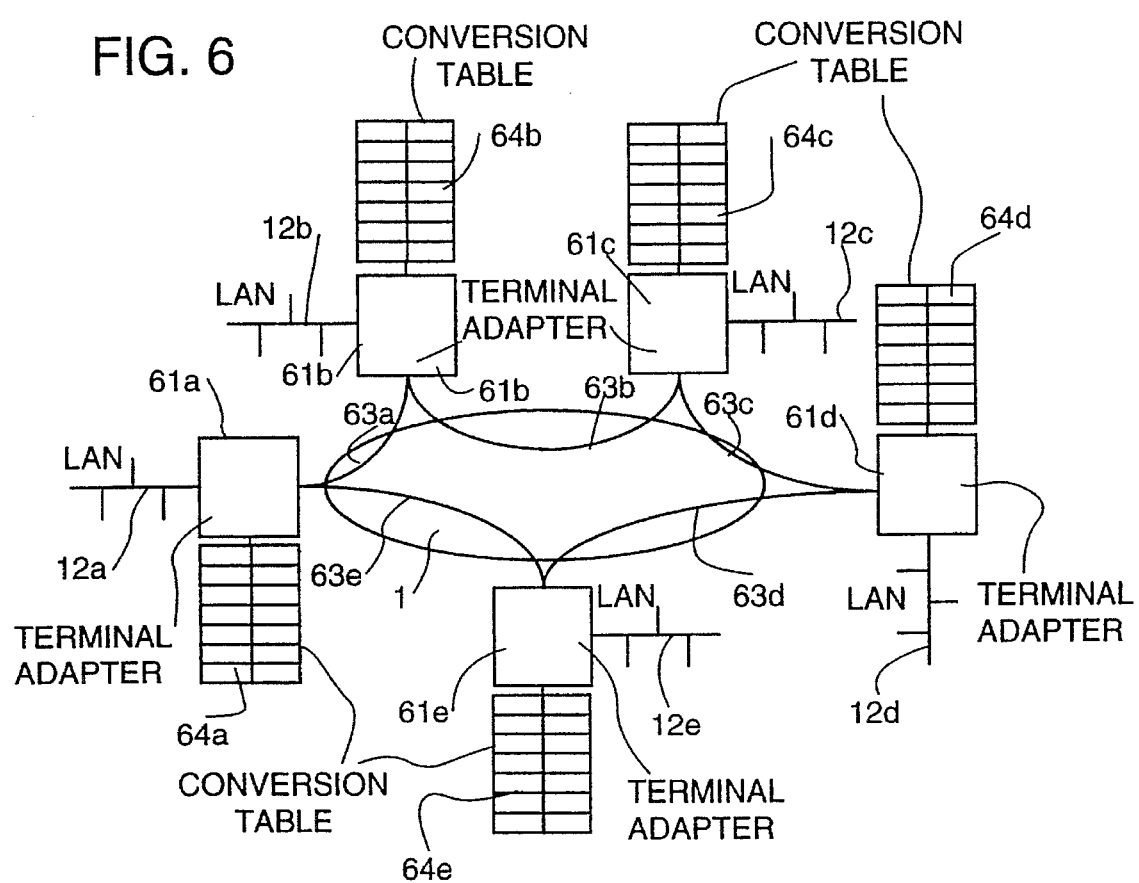
FIG. 6 is a schematic diagram showing a communications network, illustrating a fourth embodiment of the multicast communications method according to the present invention.

FIG. 6 shows a communications network, illustrating a fourth embodiment of the multicast communications method according to the invention. In this embodiment, each of the terminal adapters 61*a*, 61*b*, 61*c*, 61*d* and 61*e* has a conversion table 64*a*, 64*b*, 64*c*, 64*d* and 64*e*, respectively, containing addresses of LAN terminals under its control and/or a network address of the LANs. The terminal adapters 61 exchange a part or all of their tables 64*a*, 64*b*, 64*c*, 64*d*, 64*e* with each other to know which terminal adapter is associated with particular terminal equipment or communications networks connected to the WAN 1. Each terminal adapter 61 periodically or nonperiodically (as when responding to an instruction from a network manager, for example) multicasts all or a part of its table 64 to other terminal adapters. Rather than sending the copy of the table to all terminal adapters, each terminal adapter 61 relays the received table successively through virtual circuits set up beforehand, or as necessary. When these virtual circuits are not used, their transmission path bandwidth can be made available for other traffic. Since this embodiment enables effective use of transmission path bandwidth, it offers an advantage that the multicasting has little effect on the traffic of real data transmission.

Figure 7:
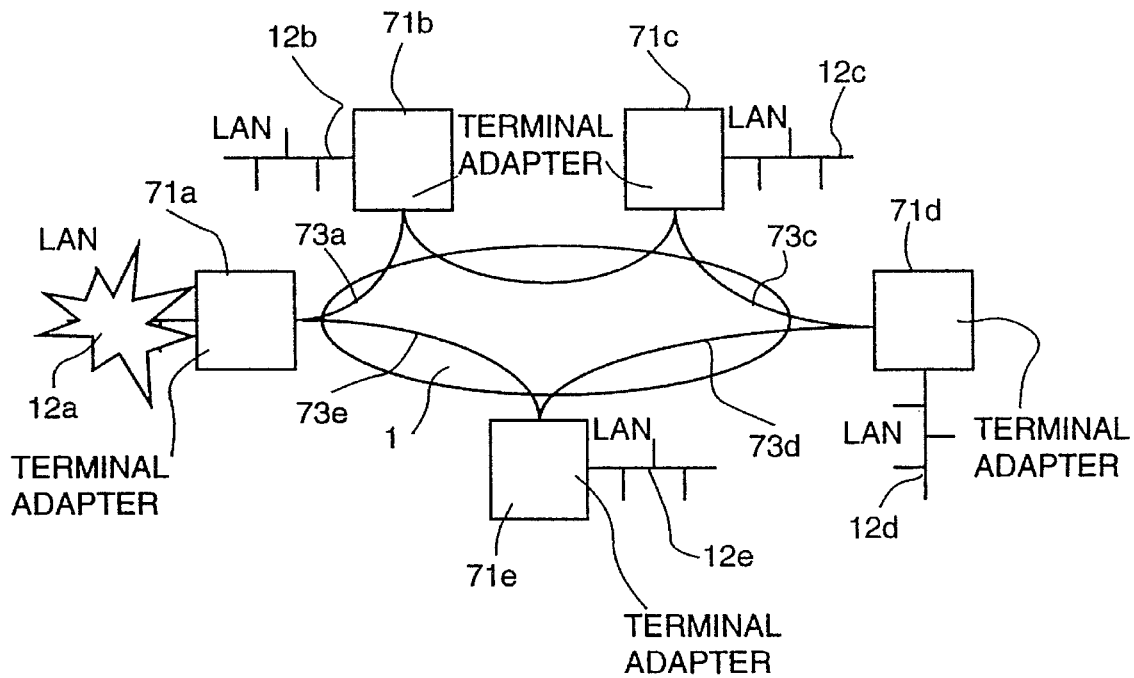
FIG. 7 is a schematic diagram showing a communications network, illustrating a fifth embodiment of the multicast communications method according to the present invention.

FIG. 7 shows a communications network, illustrating a fifth embodiment of the multicast communications method according to this invention. In this embodiment, the status of the LANs or terminal equipment connected to the network can be monitored. For example, when trouble occurs in LAN 72*a*, a terminal adapter 71*a* detects that the LAN 72*a* has failed and notifies the terminal adapters connected to the other LANs 12*b*, 12*c*, 12*d* and 12*e*. This notification is performed using a specific ATM cell sent out from the terminal adapter 71*a*. This specific ATM cell is relayed successively to the terminal adapters 71*b*, 71*c*, 71*d*, 71*e* in order. Thereafter, if any of the terminal adapters receives from its LAN (or terminal equipment, not shown) a packet of information to be sent to the failed LAN 72*a*, the terminal adapter determines that the instruction for sending the cells into the wide area network 1 should be canceled. Instead, the terminal adapter receiving such a packet for transmission to the LAN 72(*a*) notifies its LAN equipment that it is impossible to send cells to the LAN 72*a* and likewise the equipment connected to that LAN. By this method, since the cells to be sent to inaccessible LANs or terminal equipment are not transmitted into the wide area network 1, the traffic in the wide area network 1 is not unnecessarily increased.

Figure 8:
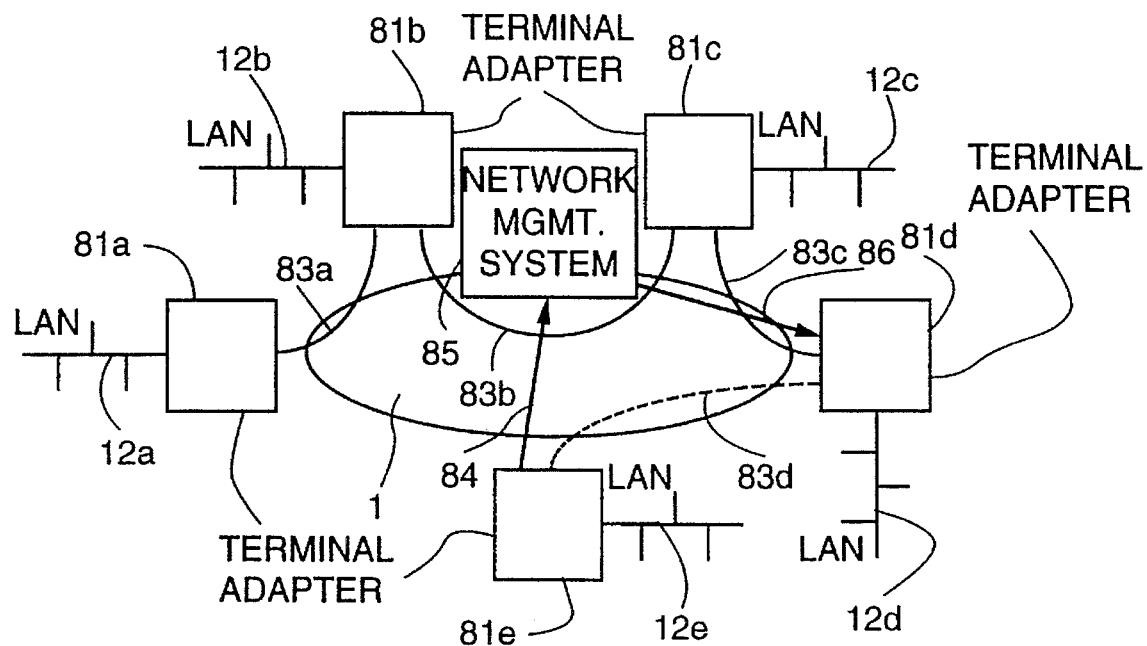
FIG. 8 is a schematic diagram showing a communications network, illustrating a sixth embodiment of the multicast communications method according to the present invention.

FIG. 8 shows a communications network illustrating a sixth embodiment of the multicast communications method according to the invention. In this embodiment, the communication between existing terminal equipment and communications networks linked to a WAN 1 can be expanded to include a new terminal. For example, when a new terminal adapter 81*e* is added to the existing logical bus network, it notifies a network management system 85, which manages virtual circuits 83*a*, 83*b*, 83*c*. Included in the notification, which is transmitted through the WAN, is the instruction that terminal adapter 81*e* will participate in the network. The network management system 85 then sets up a new virtual circuit 83*d* that connects terminal adapter 81*e*, a new transfer destination, to the terminal adapter 81*d*, which was the previous end point of the logical bus.

As an alternative to adding the new terminal adapter 81*e* at the end of the bus system, it is possible to add the new terminal adapter to an intermediate point in the bus system. To accomplish this, the network management system assigns new VCIs to the terminal adapters on each side of the intermediate point to which the new terminal adapter is to be added and notifies the terminal adapters accordingly. Also, an existing terminal adapter can be removed from the bus system by following a similar procedure, wherein the terminal adapters on either side of the terminal adapter that is to be removed are notified of each other's VCIs, which are to be used in completing the logical link across the removed terminal adapter. With these methods it is possible to easily alter the network configuration simply by notifying the network management system 85 of the alterations. While this embodiment suggests the use of a network management system 85, the methods can also be accomplished by using a switched system.

Figure 9:
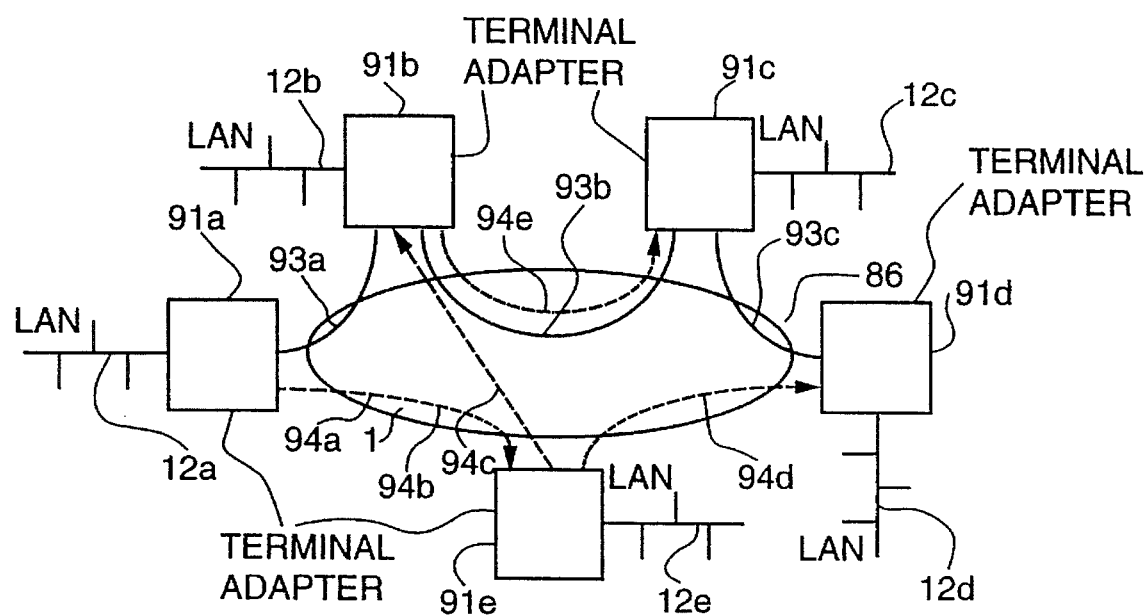
FIG. 9 is a schematic diagram showing a communications network, illustrating a seventh embodiment of the multicast communications method according to the present invention.

FIG. 9 shows a communications network, illustrating a seventh embodiment of the multicast communications method according to the invention. Terminal adapters 91*a*, 91*b*, 91*c*, 91*d* and 91*e* are interconnected by two kinds of virtual circuits. For example, the terminal adapters 91*a*, 91*b*, 91*c* and 91*d* are interconnected by virtual circuits 93*a*, 93*b* and 93*c* to provide a first virtual network within the WAN 1. At the same time, the terminal adapters 91*a*, 91*b*, 91*c*, 91*d* and 91*e* are also interconnected by virtual circuits 94*a*, 94*c*, 94*e* and 94*d* to provide a second virtual network. Each of the virtual networks uses a different kind of virtual circuit and so the virtual networks operate independently of each other. As a result, two virtual networks that do not interfere with one another within the same WAN are provided by the system of this embodiment.

Figure 10:
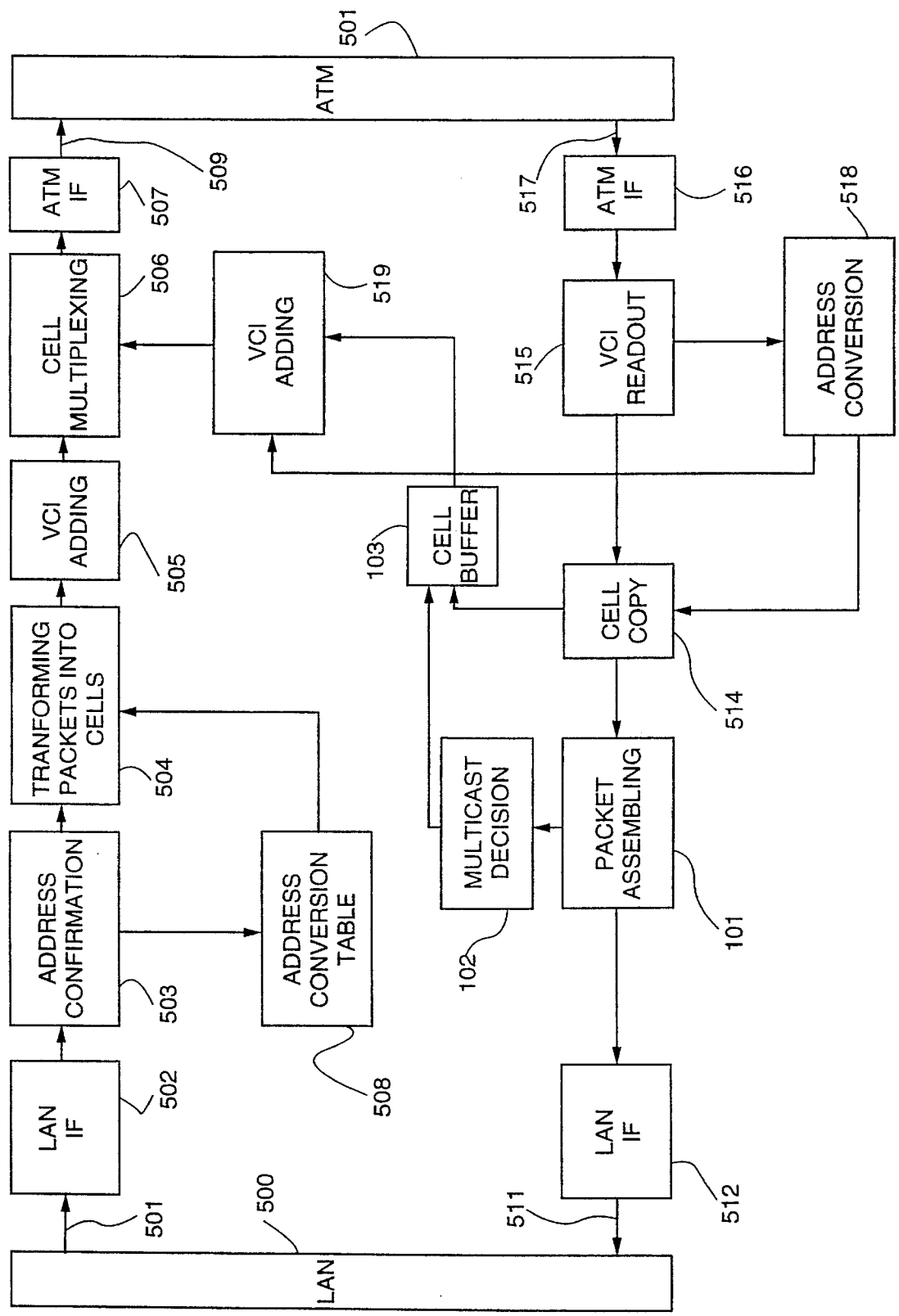
FIG. 10 is a block diagram showing another example of a terminal adapter used in the multicast communications methods of the present invention.

In FIG. 10, a block diagram showing another example of a terminal adapter used in the multicast communications methods according to the invention is shown. The terminal adapter of FIG. 10 differs from that of the one shown in FIG. 5, however, the blocks that function identically with those of the terminal adapter of FIG. 5 are designated by like reference numerals and their descriptions are omitted accordingly.

In the terminal adapter of FIG. 10, a decision as to whether or not to multicast the cells received from the wide area network is made after the cells that are received are assembled into a packet. Specifically, the ATM cells received from the wide area network 1 are transferred through an ATM interface 516 to a VCI readout block 515, which reads the VCI of each cell to see if the cell is required to be multicast or not. When the cell is specified to be multicast, the transmitted VCI is determined in like manner to the way in which it is disclosed as being determined for the terminal adapter of FIG. 5.

When the cells are to be multicast, they are copied by a cell copy block 514 and the copy is accumulated in a cell buffer 103. The ATM cells are assembled into a LAN packet by a packet assembly block 101. At this time, according to the VCIs attached to the cells for multicast communications, it is decided by a multicasting decision block 102 whether the cells should be further transmitted. When further transmission is necessary, the multicasting decision block 102 instructs the cell buffer 103 to transmit the cells. According to this embodiment, the decision as to whether or not the copied cells should be further transmitted is made while the packet is assembled. By the method of this embodiment, since the decision of whether or not the cells are to be multicast is made after examining the contents of the received information and while the cells are still stored in the cell buffer, unnecessary transmission of the cells is avoided, thus preventing an unnecessary increase in traffic.

Figure 11:
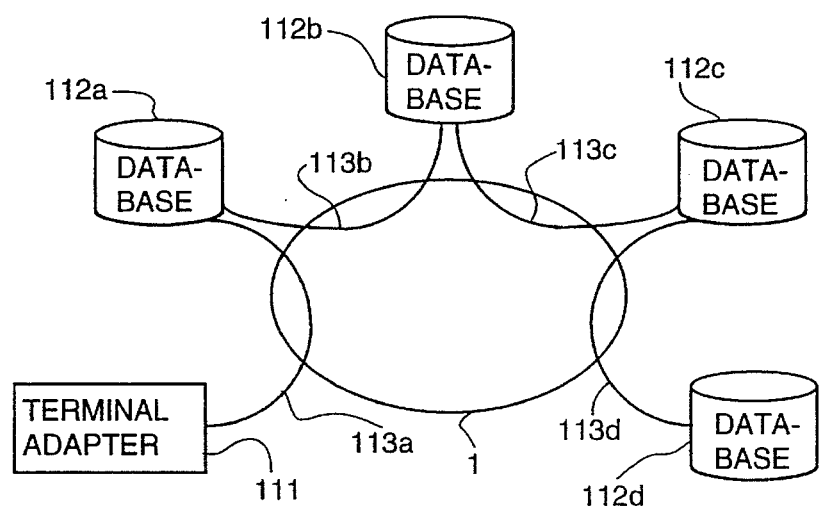
FIG. 11 is a schematic diagram showing a communications network, illustrating an eighth embodiment of the multicast communications method according to the present invention.

FIG. 11 shows a communications network, illustrating an eighth embodiment of the multicast communications method according to the invention. In this embodiment, 111 is connected to a plurality of databases 112a, 112b, 112c, 112d through the wide area network 1. In searching for information, the terminal adapter 111 makes a data query request to the database 112a, which is connected to the terminal adapter 111 via a virtual circuit 113a. The database 112a processes the request and returns the result of processing through the virtual circuit 113a to the terminal adapter 111. If the request cannot be processed, the database 112a transfers the request to the next database 112b through a virtual circuit 113b. The database 112b handles the request by following a similar process. Upon completion of the processing, the database 112b returns the result to the terminal adapter 111. When the request cannot be completed, it then transfers the request to the next database 112c. This process is repeated until all of the databases distributed in the network have been searched unless the result can be obtained before then, in which case further processing is terminated and the result is returned to the terminal adapter where the query originated.

Figure 12:
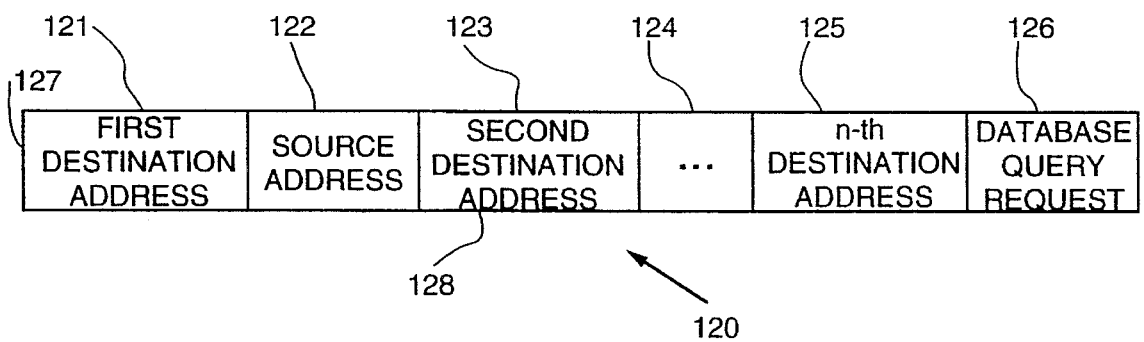
FIG. 12 is a schematic diagram showing a configuration of a protocol data unit.

FIG. 12 shows a schematic representation of an example of a protocol data unit 120 having an address destination part 127 and an information field 128 that is suitable for performing the above-discussed database query originating from the terminal adapter 111 in FIG. 11. The terminal adapter 111 sets the address 121 of the first database 112a in the destination address part 127 of the data unit. In the information field 128 of the data unit, addresses 123, 124 and 125 are set for the databases 112b, 112c, 112d to be searched successively. In the field 126, information is set indicating that a database query is being transmitted. When the object or result of the query is not obtained in the first database 112a, the database 112a writes the second destination address 123 into the address destination part 127 of the data unit and sends it to back into the network. On the other hand, if the object or result of the query is obtained in the first database 112a, the database uses the source address 122 to return the result to the terminal adapter that initiated the query. The databases 112b, 112c perform a similar process in response to receiving the protocol data unit 120.

Figure 13:
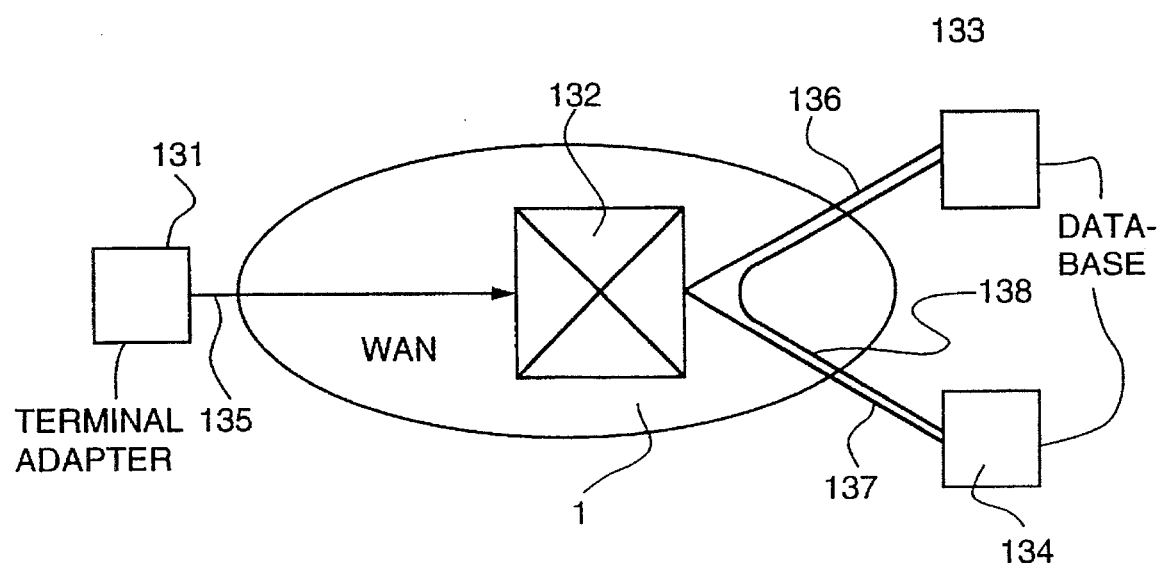
FIG. 13 is a schematic diagram showing a communications network, illustrating a ninth embodiment of the multicast communications method according to the present invention.

FIG. 13 is a communications network, illustrating an eighth embodiment of the multicast communications method according to the invention. In this embodiment, a virtual circuit is formed between remote databases 133 and 134. Terminal adapter 131 makes a request to the network management system or a switched system 132 that a virtual circuit 138 be set up between a database 133 and a database 134. The switched system 132 sets up a virtual circuit 138 by using signal lines 136 and 137. The method of this embodiment makes it possible to remotely search distributed databases 133, 134 and eliminates the need for the terminal adapter 131 to make copies of cells and send them out to a plurality of databases. Although this embodiment is applied to the databases query, it is generally applicable to other types of requests for distributed systems that perform data processing.

While the present invention has been described in conjunction with the above embodiments, it is not limited to these. For example, in place of the terminal adapters employed in the above embodiments, bridges, routers, or gateways that have been known to be used in LANs can be used to interconnect customer premises equipment installed at multiple locations in a wide area network that operates in an asynchronous transfer mode. In this configuration, the address information of the terminal adapter that is under control of the bridges, routers or gateways can be transferred among them through a communication path that successively connects the bridges, routers or gateways.

Figure 14A:
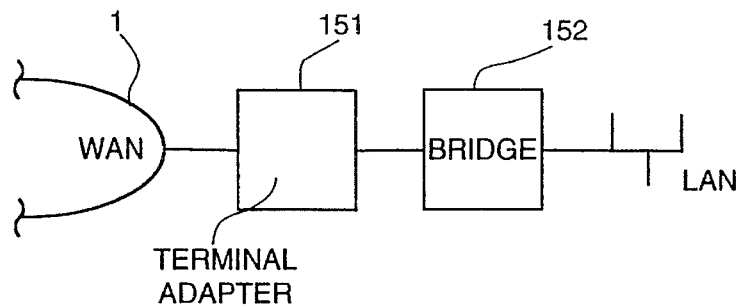
FIG. 14(a) is a diagram showing the connection between a communications network and a wide area network according to the first through ninth embodiments of the invention.

FIG. 14(a) shows an example of a terminal adapter 151 connected via a bridge 152 to a WAN 1. Although it is not discussed in the preceding embodiments of the invention, the terminal adapters of these embodiments are preferably connected to the WAN via a bridge, as shown in FIG. 14(a). In order to communicate between a data terminal connected on one LAN to a data terminal connected to another communications network (LAN, for example) or to another terminal equipment over the WAN using a bridge connected therebetween, the source data terminal must provide the physical address, for example a MAC (medium access control) address of the destination data terminal. Based on the MAC address that is provided, the terminal identifier then provides a VCI header that can be used to transmit the data to the intended terminal equipment or LAN.

Figure 14B:
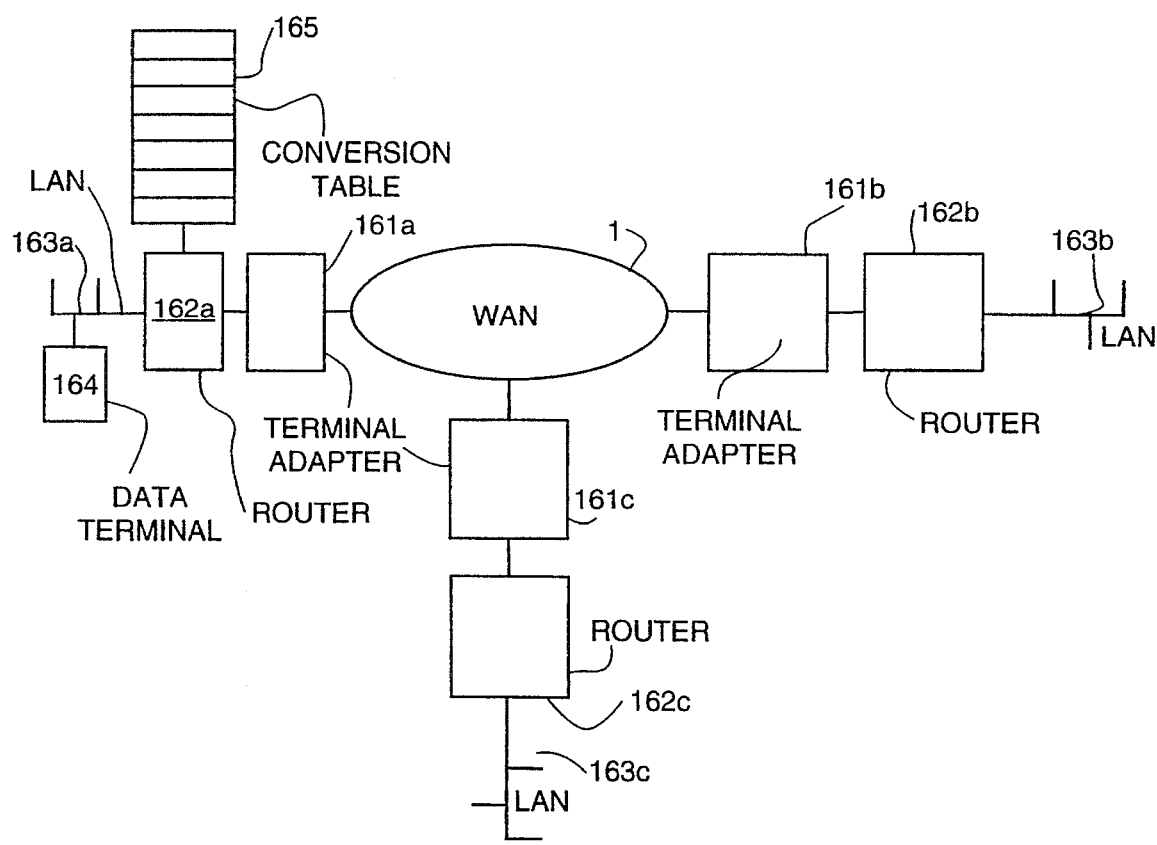
FIG. 14(b) shows a communications network according to a tenth embodiment of the multicast communications method according to the present invention.

As an alternative to using a bridge connected between the terminal adapter and the communications network or terminal equipment, FIG. 14(b) shows terminal adapters 161a, 161b and 161c connected via routers 162a, 162b and 162c to respective LANs 163a, 163b and 163c. Each of the routers has a conversion table, however only one conversion table 165 is shown connected to router 162a. The conversion tables for the routers maintain address data for each of the data terminals on the LANs. According to the present invention, the router tables can be updated by transmitting cells through the ATM network by a network management system or through a router and terminal adapter at one of the source/destination nodes in the network that has a change in its table data. Accordingly, the router conversion table data for a prescribed number of routers connected to a WAN can be constantly updated without requiring dedicated lines to be connected to the routers, as in the conventional manner.

Each of the LANs has a plurality of data terminals. Only one data terminal 164 is shown connected to LAN 163a, for simplicity. When data is transmitted within the network arrangement shown in FIG. 14(b), the router 162a receives a LAN packet from a source data terminal 163a and transfers it to the terminal adapter 161a if the destination address for the data is determined to be outside the LAN. Specifically, data terminal 164 supplies a logical network address as the destination address, such as an Internet protocol address (IP address) to identify the data terminal to which the data is intended to be transmitted. When the router decides that the logical network address or IP address is outside of the LAN to which it is connected, the router transmits the packet to the terminal adapter 161a. Terminal adapter 161a, which has a conversion table similar to table 508a in FIG. 5(b), then supplies the appropriate VCI header and transforms the packet into cells that are then transmitted over the WAN 1. The transmitted cells are then received by the designated terminal adapter of another terminal equipment or communications network on the WAN.

Figure 14C:
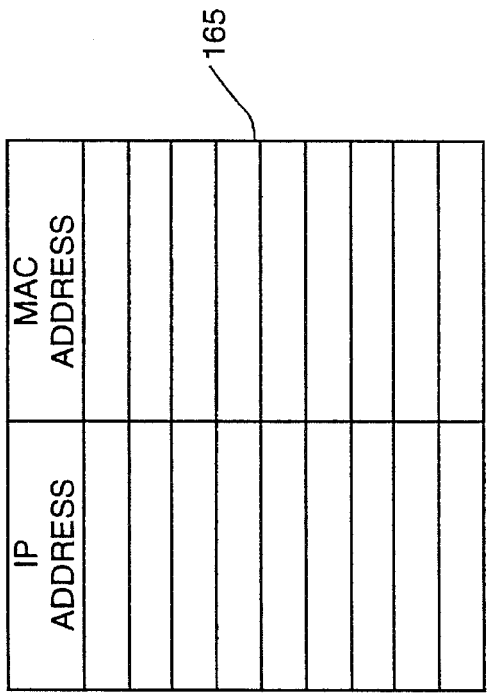
FIG. 14(c) shows a conversion table for the router shown in FIG. 14(b)
Figure 14D:
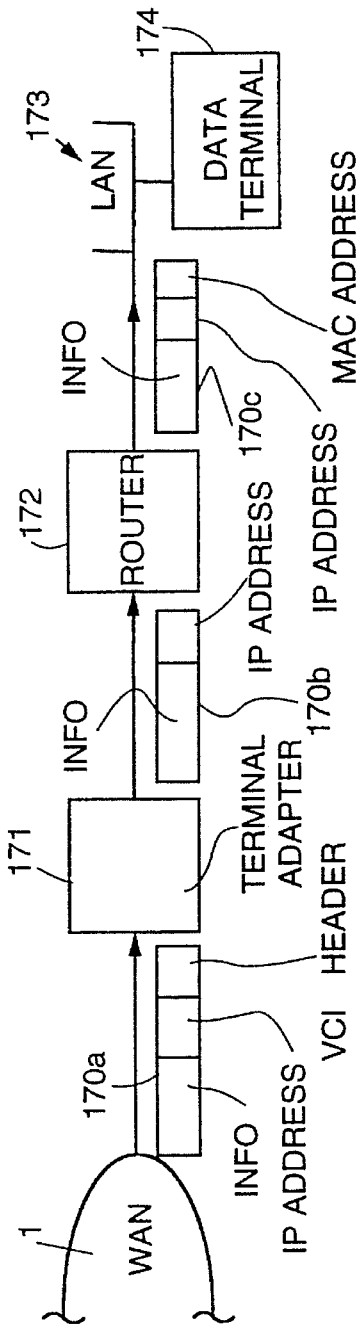
FIG. 14(d) is a block diagram showing the transmission of data from the WAN to the LAN according to the tenth embodiment of the present invention.

Receiving cells transmitted over the WAN with a network configured like that shown in FIG. 14(b) is explained with reference to FIG. 14(d), as follows. An ATM cell 170 with a VCI header is received through a suitable interface from WAN 1 by a terminal adapter 171. Terminal adapter 171 strips the VCI header from the received cell, leaving an IP address as the header. Then, the cell is transmitted as a packet 170b to router 172 with the IP address header. Router 172 receives the packet 170b and uses the IP address header to generate a MAC address header, by using conversion table 165, shown in detail in FIG. 14(c), and then sends a packet 170c with the MAC address header to the LAN. The MAC address is a physical data terminal address on the LAN 173, so the packet 170c is picked up by data terminal 174, based on the MAC address. Of course, the ATM cells received from the WAN can be multicast to several or broadcast to all of the data terminals on the LAN 173, depending on the destination address information that is provided.

Although the invention has been explained with reference to connecting the terminal adapter to a bridge and alternatively connecting the terminal adapter to a router, it is possible to provide the terminal adapter with a router function, thus obviating the need for the intermediate equipment. Specifically, the terminal adapter can be designed to accept the IP address directly from a data terminal of a LAN and bind the IP address with a VCI header for subsequent transmission over the WAN 1. Similarly, upon receiving an ATM cell with a VCI header, the terminal adapter can be provided with a conversion table with the information that is required to convert the cell into a LAN packet having a MAC address header that can then be sent to a data terminal in the LAN to which the terminal adapter is connected.

By the method of this invention, when making a request to a plurality of remote terminals to perform the same processing, it is possible to multicast cells to the remote terminal without making a number of copies of the cells. This prevents unnecessary multicasting and a corresponding increase in traffic, which in turn allows efficient use of the network. Furthermore, by simply adding terminal adapters to the existing terminal equipment or communications networks, it is possible to perform multicast communications with remote places using an existing wide area network such as an ATM switched network.

We claim:

1. A multicast communications method for multicasting information from a source node to a plurality of destination nodes, wherein each of said source and destination nodes is connected to one of terminal equipment and a communications network and wherein said source and destination nodes are connected together by a wide area network, comprising the steps of:

first transmitting information across the wide area network from the one of terminal equipment and the communications network connected to said source node and receiving and copying the information by at least one of the destination nodes with the one of terminal equipment and the communications network connected thereto, and then transmitting the copied information across the wide area network to at least another of said one of terminal equipment and the communications network connected to said destination nodes; and repeating said receiving, copying and then transmitting steps at each of said destination nodes until said multicasting of information is completed.

2. A communications method for transmitting/receiving information between source/destination nodes of a wide area network, having terminal adapters connected thereto and having one of terminal equipment and a communications network respectively connected to each of said terminal adapters, comprising the steps of:

multicasting information from a source one of said terminal adapters to a plurality of destination ones of said terminal adapters by first transmitting the information from said one source terminal adapter across said wide area network to at least one of said destination terminal adapters, receiving the information with said at least one destination terminal adapter, selectively copying the received information and then transmitting the copied information across the wide area network from said one destination terminal adapter to at least one other of said plurality of destination terminal adapters; and repeating said receiving, copying and then transmitting steps for each of said destination terminal adapters until said multicasting of information is completed for all of said destination terminal adapters.

3. A communications method for transmitting/receiving information between source/destination nodes of a wide area network, having terminal adapters connected thereto and having one of terminal equipment and a communications network respectively connected to each of said terminal adapters, comprising the steps of:

multicasting information from a source one of said terminal adapters to a plurality of destination ones of said terminal adapters by first transmitting the information from said one source terminal adapter across said wide area network to first ones of said destination terminal adapters fewer in number than a total number of said plurality of destination ones of said terminal adapters, receiving the information with said first destination terminal adapters, selectively copying the received information with at least one of said first destination terminal adapters and then transmitting the copied information across the wide area network from said at least one of said first destination terminal adapters to at least one other of said plurality of destination terminal adapters.

4. A communications method according to claim 3, wherein said receiving, copying and then transmitting the copied information is repeated until all of said plurality of destination ones of said terminal adapters receives the information.

5. A communications method according to claim 3, wherein one of said first destination terminal adapters receiving the information makes two copies of the information in said copying step and further respectively transmits both copies of the copied information in said step of transmitting the copied information.

6. A communications method for transmitting/receiving information between source/destination nodes of a wide area network, having terminal adapters connected thereto and having one of terminal equipment and a communications network respectively connected to each of said terminal adapters, comprising the steps of:

multicasting information received by one of said terminal adapters to a plurality of said terminal adapters by first dividing the received information into cells, adding a virtual channel identifier (VCI) to each cell, and first transmitting the cells across the wide area network;

selectively receiving and then selectively copying the transmitted cells with at least one of said plurality of terminal adapters;

said at least one of said terminal adapters selectively forwarding the received information to said one of terminal equipment and a communications network connected thereto, providing the copied cells with new virtual channel identifiers (VCIs) and then transmitting the copied cells with the new virtual channel identifiers over the wide area network to at least another one of said plurality of terminal adapters; and repeating said receiving, selectively copying, selectively forwarding, selectively providing of said new virtual channel identifier and then transmitting steps until all of said plurality of terminal adapters receive the information.

7. The communications method according to claim 6, wherein said receiving is limited to only one said first terminal adapter and said repeating of said receiving is limited to only one said another of said plurality of terminal adapters so that a loop shaped communication path through the wide area network is formed.

8. The communications method according to claim 6, wherein in said selectively copying step, two copies of the cells are made and wherein in said providing new VCIs step, each of the copied cells is provided with a new VCI so that in said then transmitting step two said at least another of said plurality of terminal adapters receive said cells to form a tree shaped communication path through the wide area network.

9. The communications method according to claim 6, wherein in said multicasting step, LANs are connected to the terminal adapters as said one of terminal equipment and the communications network and management information for managing the LANs is exchanged therebetween.

10. The communications method according to claim 9, wherein in said multicasting step, information for managing addresses in the LANs is exchanged as said management information.

11. The communications method according to claim 10, wherein in said multicasting step, information for identifying a failed LAN is exchanged as said management information.

12. The communications method according to claim 9, wherein in said multicasting step, information for setting up communications paths between the one of terminal equipment and the communications network is exchanged as said management information.

13. The communications method according to claim 12, wherein in said multicasting step, information for setting up communications paths in the wide area network is information on one of a new terminal equipment and the communications network with terminal adapter being connected to or removed from the wide area network.

14. The communications method according to claim 12, wherein in said multicasting step, information for setting up communications paths in the wide area network is information defining a time delay due to said transmitting between said terminal adapters.

15. The communications method according to claim 12, wherein in said multicasting step, information for setting up communications paths in the wide area network includes a number of intermediate nodes through which the information passes in said transmitting steps.

16. The communications method according to claim 9, wherein the communications paths formed in the wide area network between the terminal adapters are altered according to the kind of the management information.

17. The communications method for transmitting/receiving information between source/destination nodes of a wide area network, having terminal adapters connected thereto and having one of terminal equipment and a communications network respectively connected to each of said terminal adapters, comprising the steps of:

multicasting information from a source one of said terminal adapters to a plurality of destination ones of said terminal adapters by first transmitting the information from said one source terminal adapter across said wide area network to at least one of said destination terminal adapters, receiving the information with said at least one destination terminal adapter, selectively copying the received information and then transmitting the copied information across the wide area network from said one destination terminal adapter to at least one other of said plurality of destination terminal adapters; and repeating said receiving, copying and then transmitting steps for each of said destination terminal adapters until said multicasting of information is completed for all of said destination terminal adapters wherein said plurality of destination terminal adapters are each connected to a database as said one of terminal equipment and the communications network connected thereto and said multicasting step includes multicasting a database query from said source terminal adapter to said destination terminal adapters, which then forward the database query to the database connected thereto for executing the query.

18. The communications method according to claim 17, wherein in said multicasting of the database query, said source terminal adapter transmits information that includes addresses of the plurality of databases in a predetermined order, an address of the source terminal adapter and data of the query, and wherein successive ones of said plurality of destination terminal adapters that receive said database query information provide a header for transmission over the wide area network directing transmission of the database query information to a next one of the plurality of databases according to the predetermined order; and said steps of receiving, executing of said database query and said providing a header are performed for further transmitting said database query information to each of said successive destination terminal adapters until a result of the database query is obtained.

19. The communications method for transmitting/receiving information between source/destination nodes of a wide area network, having terminal adapters connected thereto and having one of terminal equipment and a communications network respectively connected to each of said terminal adapters, comprising the steps of:

multicasting information from a source one of said terminal adapters to a plurality of destination ones of said terminal adapters by first transmitting the information from said one source terminal adapter across said wide area network to first ones of said destination terminal adapters fewer in number than a total number of said plurality of destination ones of said terminal adapters, receiving the information with said first destination terminal adapters, selectively copying the received information with at least one of said first destination terminal adapters and then transmitting the copied information across the wide area network from said at least one of said first destination terminal adapters to at least one other of said plurality of destination terminal adapters wherein said plurality of destination terminal adapters are each connected to a database as said one of terminal equipment and the communications network connected thereto and said multicasting step includes multicasting a database query from said source terminal adapter to said destination terminal adapters.

20. The communications method according to claim 19, wherein in said multicasting of the database query, said source terminal adapter transmits information that includes addresses of the plurality of databases in a predetermined order, an address of the source terminal adapter and data of the query, and wherein each successive said destination terminal adapter that receives said database query information provides a header for transmission over the wide area network directing transmission of the database query information to a next one of the plurality of databases according to the predetermined order, said receiving, executing of said database query and said providing a header for further transmitting said database query information to each said successive destination terminal adapter continues until a result of the database query is obtained.

21. A communication method in a network system having a plurality of local area networks distributed at a plurality of locations, each of said local area networks including a plurality of terminal equipment and connected through node devices with a wide area network that operates in an asynchronous transfer mode, said method comprising the steps of:

establishing logical paths in said wide area network so that said node devices are coupled in series through said logical paths; and multicasting management information to be managed by said node devices by creating a copy of received information at each of said node devices when each of said node devices receives management information from an up-stream one of said node devices and transferring said copied information to at least one down-stream one of said node devices along said logical paths set up in the wide area network.

22. A multicast communications method for a network having a wide area network, a plurality of source/destination nodes connected to said wide area network, and a plurality of terminal equipment connected to said source/destination nodes, comprising the steps of:

setting up a plurality of logical paths in said wide area network so as to form a subnetwork of a predetermined number of said plurality of terminal equipment, the number of said logical paths being less than a total number of said terminal equipment in the subnetwork; and multicasting information from a source one of said terminal equipment to others of said terminal equipment within the subnetwork by transferring copied information along said logical paths, including producing said copied information by one of said source nodes along said logical paths of said subnetwork.

23. A terminal adapter for connecting terminal equipment to a wide area network, comprising:

first means for transforming sending information containing destination addresses and sent from the terminal equipment into cells and adding to each of the cells a transmitting virtual channel identifier prepared based on the destination addresses;

second means for detecting the VCIs of the received cells that are received from the wide area network, deciding if the received cells are to be multicast, and if so, copying the received cells, and giving the copied cells transmitting VCIs corresponding to next transmission destination addresses;

means for transmitting the cells including multiplexing the cells from the first and second means and sending the multiplexed cells to the wide area network; and means for converting the received cells into received information and sending the information to the terminal equipment.

24. A terminal adapter connecting terminal equipment to a wide area network (WAN), comprising:

first means for transforming sending information containing destination addresses sent from the terminal equipment into cells and adding to each of the cells a transmitting virtual channel identifier based on the destination addresses;

means for transforming cells received from the WAN into information for the terminal equipment and sending the transformed received information to the terminal equipment;

means for receiving and copying the cells received from the WAN;

means for deciding, based on the received information, whether or not the received cells are ones to be multicast;

second means for adding transmitting virtual channel identifiers corresponding to the next transmission destination address to the copied cells made by the cell copying means when the received cells are determined to be ones to be multicast according to said deciding means; and means for transmitting the cells including multiplexing the cells from the first and second means and sending the multiplexed cells to the WAN.

25. A terminal adapter connecting terminal equipment to a wide area network (WAN), comprising:

first means for transforming sending information containing destination addresses sent from the terminal equipment into cells and adding to each of the cells a transmitting VCI based on the destination addresses;

means for transforming cells received from the WAN into information for the terminal equipment and sending the transformed received information to the terminal equipment;

means for deciding, while the cells are being transformed by said transforming means and based on the received information, whether or not the received cells are ones to be multicast;

means for receiving and copying the cells received received from the WAN;

second means for adding transmitting VCIs corresponding to next transmission destination addresses to the copied cells made by the cell copying means when the received cells are determined to be ones to be multicast according to said deciding means; and means for transmitting the cells including multiplexing the cells from the first and second means and sending the multiplexed cells to the WAN.

26. The terminal adapter according to claim 23, wherein the terminal equipment are LANs and the wide area network is an ATM switched network.

27. The terminal adapter according to claim 24, wherein the terminal equipment are LANs and the wide area network is an ATM switched network.

28. The terminal adapter according to claim 25, wherein the terminal equipment are LANs and the wide area network is an ATM switched network.

29. A multicast communications method for multicasting information from a source node to a plurality of destination nodes, said source node and destination nodes being connected to each other by a wide area network, comprising the steps of:

first transmitting information across the wide area network from a source terminal connected to said source node; and receiving the information by at least one of the destination nodes with a destination terminal, then producing at least one copy of said received information and transmitting the copied information across the wide area network to at least another of the destination nodes with another destination terminal; and repeating said receiving, copying and transmitting steps at each of said destination nodes until said multicasting of information is completed.

30. A multicast communication method for multicasting information from a source node to a plurality of destination nodes, said source node and destination nodes being connected to each other by a wide area network, comprising the steps of:

first transmitting information across the wide area network from a source terminal connected to said source node; and receiving the information by at least one of the destination nodes with a destination terminal, then producing at least one copy of said received information and transmitting the copied information across the wide area network to at least another of the destination nodes with another destination terminal;

repeating said receiving, copying and transmitting steps at each of said destination nodes until said multicasting of information is completed;

wherein said source node and each of said destination nodes includes an adapter for coupling said respective source and destination terminals to said wide area network via a local area network, said method further comprising the steps of:

converting, by an adapter means associated with said source node, information received from said source terminal into at least one fixed length cell having a virtual channel identifier for designating a logical channel predefined between said source node and said one of destination nodes in said wide area network, and transmitting the cell instead of said information to said wide area network; and receiving said cell by said one of destination node, then converting said cell into original information by an adapter means associated with the destination node to transmit the information to a destination terminal connected to the adapter, and transmitting a copy of said received cell to said wide area network, the copy of said received cell having another virtual channel identifier for designating a logical channel predefined between the destination node and said one of remaining destination nodes in the wide area network.

31. A multicast communications method for multicasting information from a source node to a plurality of destination nodes, said source node and destination nodes being connected to each other by a wide area network, comprising the steps of:

first transmitting information across the wide area network from said source node; and receiving the information by at least one of the destination nodes, then producing at least one copy of said received information and transmitting the copied information across the wide area network to at least another of the destination nodes from said one of the destination nodes; and repeating said receiving, copying and transmitting steps at each of said destination nodes until said multicasting of information is completed.

* * * * *